Feb. 11, 1930.
H. L. BERNARDE
1,746,629
PROTECTIVE WINDING FOR TRANSFORMERS
Filed Sept. 13, 1926
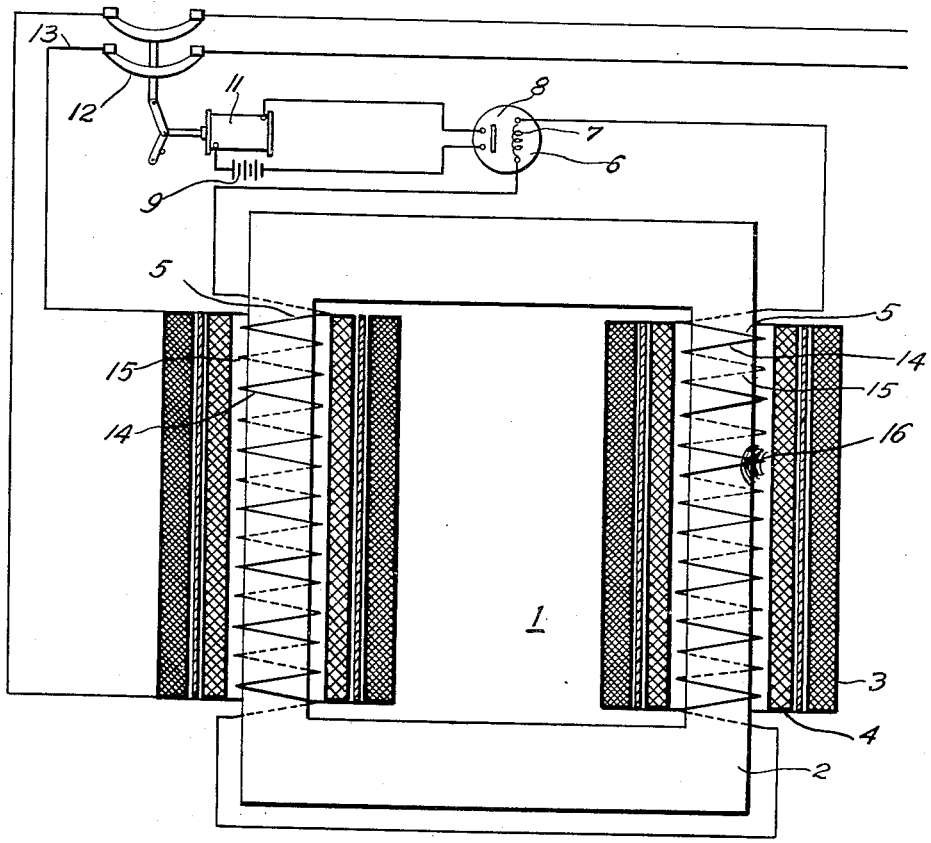
WITNESSES
INVENTOR
Henry L. Bernarde
BY
ATTORNEY Patented Feb. 11, 1930

1,746,629

UNITED STATES PATENT OFFICE

HENRY L. BERNARDE, OF SWISSVALE, PENNSYLVANIA, ASSIGNOR TO WESTINGHOUSE ELECTRIC & MANUFACTURING COMPANY, A CORPORATION OF PENNSYLVANIA

PROTECTIVE WINDING FOR TRANSFORMERS

Application filed September 13, 1926. Serial No. 134,976.

My invention relates to electrical transformers and particularly to protective windings therefor.

One object of my invention is to provide electrical apparatus with a winding that shall protect the apparatus upon the occurrence of a condition of short-circuit between the several windings of a component coil.

Another object of my invention is to provide a protective winding for electrical apparatus that shall detect the occurrence of a condition of short-circuit between adjacent turns of a component winding.

Another object of my invention is to provide a protective winding that shall normally be in a condition of balance for electrical inductive apparatus but that shall become unbalanced upon the occurrence of a condition of short-circuit between adjacent turns of a component coil.

In electrical transformers, generators and motors, trouble frequently results from the breakdown of the insulating medium between adjacent turns of the several coils and or windings. Difficulty has been experienced in detecting such breakdowns in their early stages and repairing the defective parts before the fault becomes of such proportions as to endanger, and possibly destroy the entire apparatus. When a condition of short-circuit occurs between adjacent turns of a coil, sparking and excessive heating occur, which actions injure the insulating material on adjacent turns. The injured insulating material is liable to break down and thereby increase the defective area until the entire winding is short-circuited and the transformer rendered unfit for further operation.

According to my invention, I provide a protective winding that is composed of equal numbers of oppositely wound turns in series connection that are normally in a balanced condition. However, upon the occurrence of a condition of short-circuit between the turns of any winding, a field of leakage flux is produced that induces a current in the protective winding for operating a relay or other electrical device. The relay may automatically remove the transformer from service or operate an alarm in order to warn the operator of the dangerous condition existing in the protected apparatus.

The single figure of the accompanying drawing is a diagrammatic view of circuits and apparatus embodying my invention.

My invention comprises a transformer (1) having the usual core member (2), primary winding (3) and secondary winding (4), to which is added a protective winding (5) for operating a relay (6) or any other suitable electrical device.

The core member 2, primary winding 3 and secondary winding 4 may be of any suitable type. By describing my invention in connection with an electrical transformer, it is to be understood that its application is not so limited but that it may be employed wherever it is possible to mount the winding in such position that it may be in a field of leakage flux upon the occurrence of a condition of short-circuit between turns of the protected winding.

The relay 6 may be of any suitable type having a winding 7 and a contact-making device 8 which is closed when the coil 7 is energized by a current of a definite value for a suitable period of time. The device 8 is connected to a battery 9, or to any other suitable source of electromotive force, and to a tripping coil 11 of a circuit interrupter 12 that is inserted in a circuit 13 for supplying current to the primary winding 3.

The winding 5 comprises an equal number of oppositely wound turns 14 and 15 that are mounted on the core 2 within the projection of the primary and secondary windings thereon. The turns 14 are shown in heavy lines and are wound in one direction around the core member 2, while the turns 15 are shown in dotted lines and are wound in the opposite direction. The turns 14 and 15 are connected in series relation to each other and to the relay 6. Normally, the voltages induced in the windings 14 and 15 neutralize each other, and the relay 6 remains inactive.

Upon the occurrence of a short-circuit between turns of any winding, as at 16, a field of leakage flux is produced that energizes the adjacent turns of the protective winding 5, with the result that the electrical balance existing therein is disturbed, and a current is caused to traverse the relay 6. Upon energization of the relay 6, its contact-making device 8 is closed to energize the tripping coil 11, whereby the circuit interrupter 12 is moved to its open position, and the transformer 1 is disconnected from its source of electromotive force.

Accordingly, I have devised a protective winding for detecting a condition of short-circuit between turns of electrical windings that is characterized by the use of equal numbers of oppositely wound turns that are in a condition of electrical balance. When one or more turns of the protective winding become energized by the leakage flux incidental to a condition of short-circuit between turns of the protected winding, the condition of electrical balance is disturbed, with the result that the resulting voltage produces a current which traverses the protective winding to energize a suitable relay or indicating device.

It is to be understood that such changes may be made in the arrangement and disposition of the component parts of my invention as fall within the scope of the appended claims.

I claim as my invention:

1. The combination with a winding comprising a plurality of turns, of a protective winding comprising equal numbers of oppositely-wound turns disposed adjacent to the turns of the first winding, whereby, upon the occurrence of a condition of short-circuit between the turns of the first winding, the resultant leakage flux induces unbalanced electrical forces in the protective winding.

2. The combination with a winding comprising a plurality of turns, of a protective winding comprising equal numbers of oppositely-wound turns disposed adjacent to the turns of the first winding, and an electrical device in circuit with the protective winding, whereby, upon the occurrence of a condition of short-circuit between the turns of the first winding, the resultant leakage flux causes the protective winding to energize the electrical device.

3. In a transformer, a core member, a primary winding, a secondary winding, and a protective winding comprising equal numbers of oppositely-wound turns mounted on the core member within the projection thereon of the primary and secondary windings.

4. In a transformer, a core member, a primary winding, a secondary winding, and a protective winding comprising equal numbers of oppositely-wound turns mounted on the core member within the projection thereon of the primary winding.

5. In a transformer, a core member, a primary winding, a secondary winding, and a protective winding comprising equal numbers of oppositely-wound turns mounted on the core member within the projection thereon of the secondary winding.

6. The combination with an induction winding, of means for detecting a short circuit between turns of said winding, comprising a protective winding consisting of a plurality of non-inductively wound coils disposed adjacent the turns of said first named winding.

7. The combination with a transformer winding comprising a plurality of longitudinally spaced turns, of means for detecting short circuits between said turns, comprising a protective winding disposed adjacent said first named winding, said protective winding consisting of a plurality of series connected coils, said coils being connected so that adjacent coils are wound in opposite directions.

8. The combination with a core member and a winding comprising a plurality of turns inductively related thereto, of a protective winding comprising a plurality of coils progressively disposed on said leg contiguous of said first named winding, adjacent coils of said protective winding being oppositely wound, whereby said protective winding is noninductive with respect to the whole of said first named winding.

9. The combination with a core member and a winding comprising a plurality of turns inductively related thereto, of means for causing a failure between said turns to effect a control, which comprises placing a protective winding on said core adjacent said first named winding, said protective winding comprising a plurality of coils, each consisting of a small number of turns, said coils being connected in series circuit relation so that adjacent coils are oppositely wound with respect to each other.

In testimony whereof, I have hereunto subscribed my name this 3rd day of September, 1926.

HENRY L. BERNARDE.